(12) United States Patent
Taghezout

(10) Patent No.: US 6,437,466 B1
(45) Date of Patent: Aug. 20, 2002

(54) MONOPHASE ELECTROMECHANICAL TRANSDUCER, IN PARTICULAR OF THE HOROLOGICAL TYPE, AND ELECTROMECHANICAL DEVICE INCLUDING AT LEAST ONE SUCH TRANSDUCER

(75) Inventor: Daho Taghezout, Morges (CH)

(73) Assignee: Eta SA Fabriques d'Ebauches, Grenchen (CH)

( * ) Notice: Subject to any disclaimer, the term of this patent is extended or adjusted under 35 U.S.C. 154(b) by 0 days.

(21) Appl. No.: 08/980,969

(22) Filed: Dec. 1, 1997

(30) Foreign Application Priority Data

Dec. 4, 1996 (CH) ............................................. 2972/96

(51) Int. Cl.[7] ............................................. H02K 37/00
(52) U.S. Cl. ...................... 310/49 R; 310/254; 368/157
(58) Field of Search ..................... 310/49 R, 40 MM, 310/162, 164, 258, 259, 254, 114, 112; 368/157, 160, 162, 163

(56) References Cited

U.S. PATENT DOCUMENTS 3,699,282 A * 10/1972 Jepson et al. ............... 310/164
4,262,353 A * 4/1981 Okazaki et al. ............. 310/162
4,426,158 A   1/1984 Muller et al. ................ 368/76
4,488,819 A   12/1984 Schaffner .................... 368/220
4,563,604 A   1/1986 Xuan ........................ 310/49 R
4,679,944 A * 7/1987 Sedlak et al. ............. 310/49 R
4,681,464 A * 7/1987 Ray ............................ 368/160
4,788,669 A * 11/1988 Kamiyama .................. 368/160
4,886,988 A * 12/1989 Galie et al. ................ 310/49 R
4,912,832 A * 4/1990 Egger et al. .......... 310/40 MM
5,172,349 A * 12/1992 Triponez et al. ............. 368/157
5,400,303 A * 3/1995 Tu et al. ...................... 368/157

FOREIGN PATENT DOCUMENTS

FR           1 571 115      6/1969

* cited by examiner

Primary Examiner—Karl Tamai
(74) Attorney, Agent, or Firm—Griffin & Szipl, P.C.

(57) ABSTRACT

The monophase electromechanical transducer (2) includes a stator (8) and a rotor (4) including a permanent bipolar magnet (6). The stator is formed of a planar structure (10) defining first and second magnetic stator poles (18,20) and a core (12) carrying a coil (14), said core magnetically connecting first and second magnetic poles. The coil is situated in an opening (35) the edge (36) of which is closed on itself and the part of the planar structure which defines said second magnetic pole surrounds completely said opening and a hole (16) in which said bipolar magnet is situated.

10 Claims, 4 Drawing Sheets

MONOPHASE ELECTROMECHANICAL TRANSDUCER, IN PARTICULAR OF THE HOROLOGICAL TYPE, AND ELECTROMECHANICAL DEVICE INCLUDING AT LEAST ONE SUCH TRANSDUCER

The present invention concerns a monophase electromechanical transducer whose stator has a planar structure and whose rotor includes one permanent magnet, in particular a bipolar magnet. In particular, the present invention concerns electromechanical transducers of small dimensions, in particular adapted to watch applications.

The man skilled in the art knows various electromechanical motors, in particular in the horological field, whose stator has a planar structure and whose rotor includes a permanent magnet. As regards monophase electromechanical motors, specialists in the field of horological electromechanics know the "Lavet" type stepping motor. This motor includes a stator plate defining two magnetic stator poles of which two respective polar expansions define a stator hole within which is situated a bipolar permanent magnet mounted on the shaft of the rotor. The two magnetic stator poles define respectively two magnetic contact ears forming respectively two ends of the stator plate. A core carrying a coil and also having at its two ends two magnetic contact ears is fixed so that the two ears of the core are superposed onto the two respective ears of the stator plate. In a motor of this type, the core carrying the supply coil is always situated at the periphery of the stator plate. Swiss Patent No 639 525 shows in FIG. 1 a monophase stepping motor of the "Lavet" type which has just been described. As can be seen in FIGS. 1 and 2 of this Patent Document, the stator plate defining the two magnetic stator poles may be used as a base plate for mounting at least partially various elements of the watch movement.

Swiss Patent No 648 984 discloses a timepiece including a monophase stepping motor of the "Lavet" type described hereinbefore. This Patent Document discloses in particular the use of the stator of the monophase motor as base plate for the clockwork movement. Several mechanical and/or electronic elements are assembled on the stator plate used as the plate for the movement. In FIG. 1 of Swiss Patent No 648 984, the arrangement of core carrying the coil at the periphery of the clockwork movement has the drawback of limiting the arrangement of various elements on the plate, which constitutes a limiting restriction for the watch designer.

When the watch designer places a monophase "Lavet" type motor in a movement in which the coil of the monophase motor is not situated at the periphery of the plate of the movement, the aforementioned stator plate forms a materially different part from the movement base plate as is seen in FIG. 1 of Swiss Patent No 643 704. In the design disclosed in Swiss Patent No 643 704, the stator of the monophase motor and the base plate of the clockwork movement form two materially distinct parts, which increases the manufacturing cost and limits the miniaturisation of the clockwork movement. The aforementioned problem of the resulting space requirement is further accentuated when the clockwork movement includes several monophase motors.

An object of the invention is to provide a monophase electromechanical transducer having a stator able to be used as a plate for the assembly of a device which is easy to make, inexpensive and leaves the designer complete freedom in arranging the device, in particular in positioning the rotor and the coil of this monophase transducer.

Another object of the invention is to provide an electromechanical device including a plurality of electromechanical transducers at least one of which is a monophase transducer which has the same features and advantages as that proposed in relation to the aforementioned first object.

Another object of the invention is to provide a device including a plurality of monophase transducers allowing compact and inexpensive design of the device.

The present invention therefore concerns a monophase electromechanical transducer, in particular of the horological type, including:
a stator made of magnetic material;
a rotor including a permanent magnet;
a coil;
said stator including a planar structure and a core around which said coil is mounted, said planar structure defining two magnetic stator poles whose two respective polar expansions define a hole through which said rotor passes, said permanent magnet of said rotor being magnetically coupled to said two polar expansions, said core having its first and second ends connected respectively to said two magnetic stator poles, this transducer being characterised in that said coil is situated in an opening, provided in said planar structure, the edge of which is closed on itself so that the part of said planar structure defining said second magnetic pole surrounds the part of this planar structure defining said first magnetic stator pole and said coil in projection in the general plane of said planar structure.

In particular, it is proposed to use the present invention for the manufacture of chronograph clockwork movements of small dimensions, in particular for "ladies" watches.

The present invention will be described in more detail hereinafter with reference to the annexed drawings given by way of non-limiting examples, in which.

Figure 1:
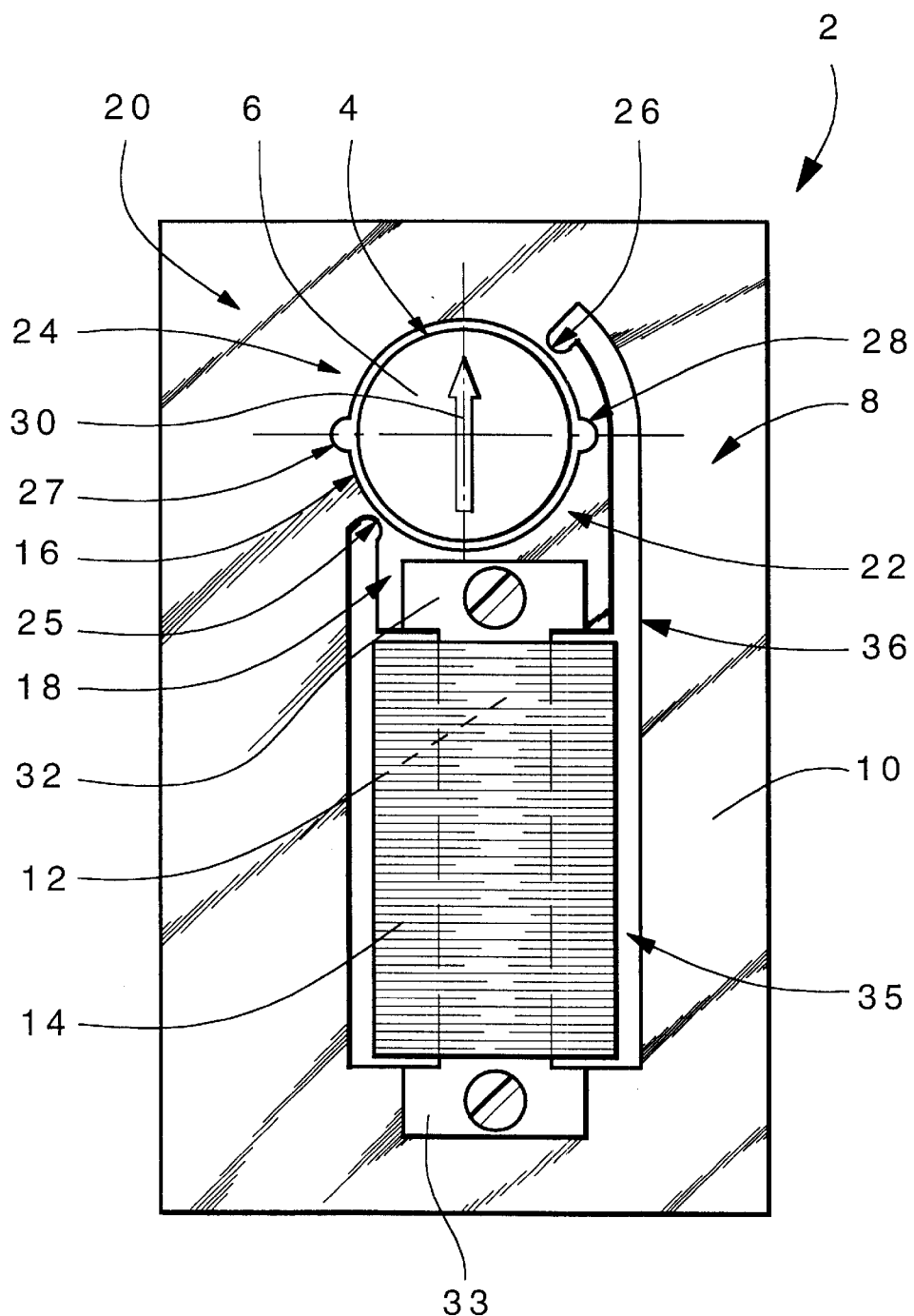
FIG. 1 shows a top view of a first embodiment of a monophase transducer according to the invention.

FIG. 1 shows a monophase electromechanical transducer 2 formed of a rotor 4, of which only bipolar permanent magnet 6 has been shown in the drawing, a stator 8 formed by a plate 10 made of soft magnetic material defining a planar structure and a core 12 carrying a supply coil 14.

Rotor 4 passes through a hole 16 provided in plate 10 which is formed of a single piece, bipolar permanent magnet 6 being situated in hole 16. This plate 10 defines the two magnetic stator poles 18 and 20 which have respectively two polar expansions 22 and 24, these latter defining said hole 16. The two magnetic poles 18 and 20 are separated from each other by means of two necks 25 and 26 and, in particular for a stepping motor application, two positioning notches 27 and 28 are provided. The magnetic axis 30 of permanent magnet 6 is substantially perpendicular to the direction defined by notches 27 and 28 when it is in one of its two minimum energy positions.

The two ends 32 and 33 of core 12 are respectively magnetically and mechanically connected to magnetic stator poles 18 and 20 to which they are superposed and directly fixed via screws or similar fixing means.

According to the invention, coil 14 mounted on core 12 is situated in a stator opening 35 arranged in plate 10. The edge 36 of stator opening 35 is closed on itself and partially defines pole 18. Pole 20 surrounds pole 18 and coil 14 in projection in the plane of plate 10. Thus, second magnetic pole 20 which is used to close the magnetic circuit of monophase transducer 2 forms a plate surrounding hole 16 and stator opening 35. Consequently, plate 10 may have any dimensions and rotor 4 and coil 14 mounted on core 12 may be positioned at any predetermined locations by the designer of the transducer according to the invention.

In addition to the advantage of arranging such a transducer in an electromechanical device and the advantage of the rigidity of such a transducer, the part of stator plate 10 defining magnetic pole 20 forms a magnetic shield for the transducer given that the external magnetic flux propagating in the plane of planar structure 10 are driven by magnetic pole 20 without any coupling with permanent magnet 6, whatever the direction of propagation of such external magnetic flux.

The electromechanical operation of monophase transducer 2 is known to the man skilled in the art, the supply of such a transducer being similar to that of a monophase stepping transducer of the "Lavet" type mentioned in the preamble to the present description.

Figure 2:
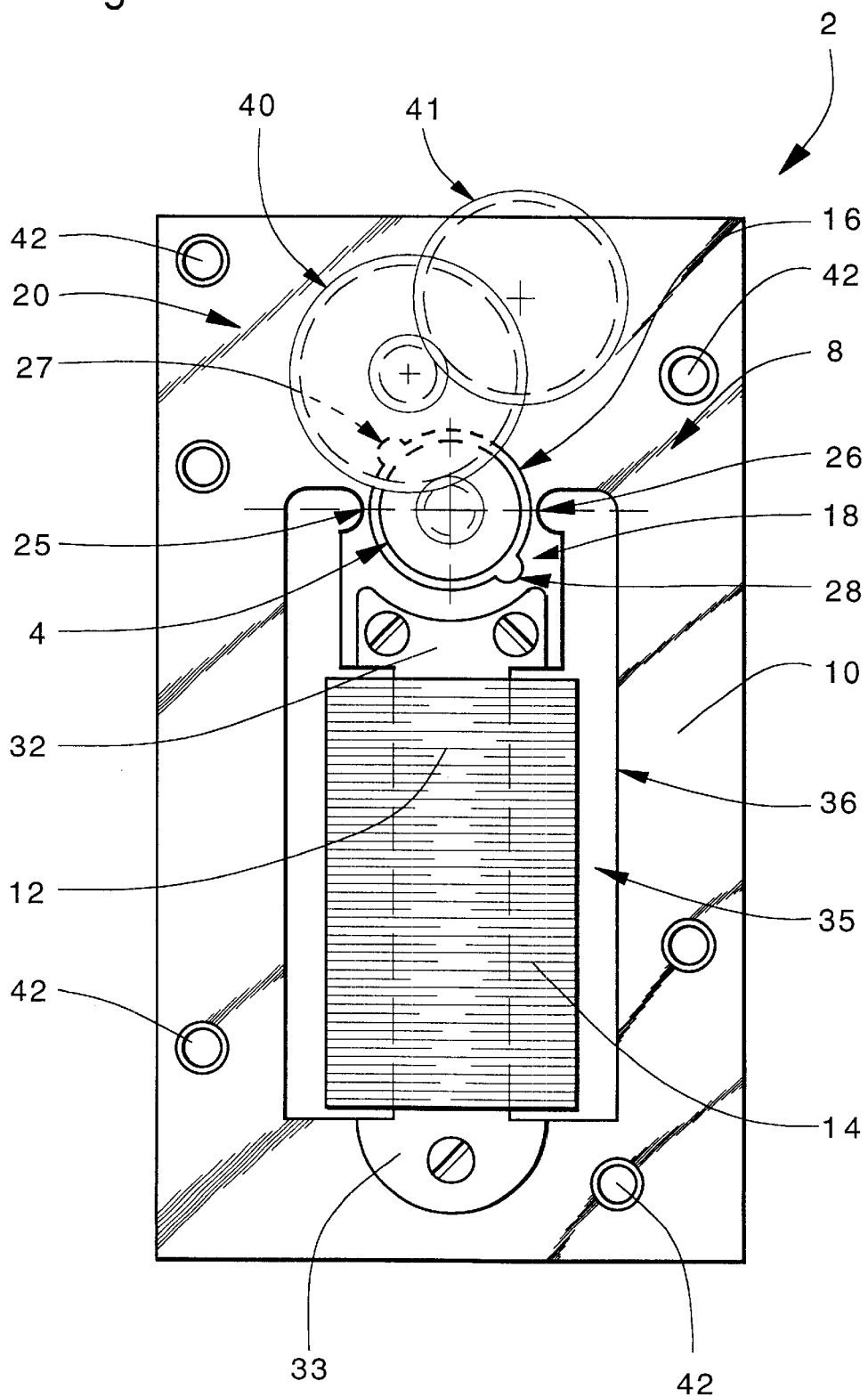
FIG. 2 is a top view of an alternative of the first embodiment of FIG. 1.

FIG. 2 shows an alternative construction of the first embodiment described with reference to FIG. 1. The references already described previously will not be described again here in detail. The alternative of FIG. 2 differs from the construction of FIG. 1 in that necks 25, 26 and notches 27, 28 are oriented differently in relation to the axis of core 12. Moreover, two wheels 40 and 41 are shown schematically, these wheels each having an end mounted in a bearing arranged in plate 10 acting jointly as stator and plate for a clockwork movement for example. Various holes 42 are also provided in plate 10 for fixing various elements which are not shown. These holes 42 may or may not be threaded. It will be noted that plate 10 may have any external contour, the rectangular representation having been given purely in order to simplify the drawing.

The monophase electromechanical transducer according to the invention shown in FIG. 2 thus includes a base plate 10 of any shape and size and two openings, namely a hole 16 having an edge closed on itself and defining a space for permanent magnet 6 of the rotor, this magnet being magnetically coupled to magnetic stator poles 18 and 20, and a stator opening 35 also having an edge 36 closed on itself. Necks 25 and 26 magnetically separating the two magnetic stator poles jointly assure a mechanical connection between first pole 18 and second pole 20. Thus, the stator includes only two planar pieces, namely plate 10 and core 12. It will be noted however that different shapes and, in particular for plate 10, structures having different thicknesses and for example millings and/or depressions and/or projections of any type may be provided without departing from the scope of the present invention. Plate 10 is a planar structure having a relief adapted to a mechanism mounted at least partially on said plate 10.

Figure 3:
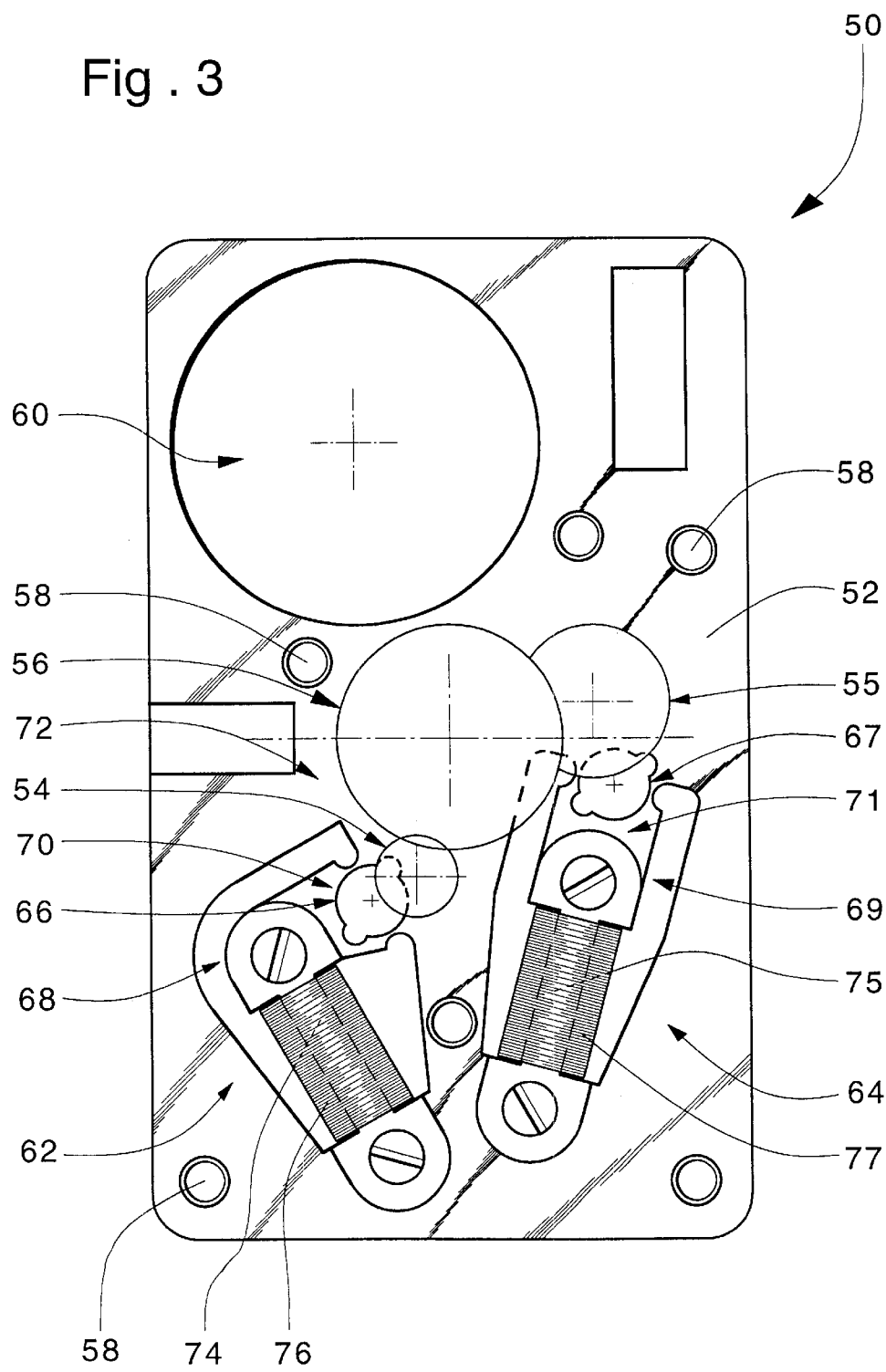
FIG. 3 is a top view of an electromechanical device including two monophase transducers according to the invention.

Referring to FIG. 3, an electromechanical device including two monophase electromechanical transducers according to the invention, such as those described previously with reference to FIGS. 1 and 2, will be described hereinafter.

The device shown in FIG. 3 is a clockwork movement 50 including a plate 52 made of soft magnetic material defining a planar structure on which are arranged various wheels 54, 55 and 56, holes 58 used for mounting various elements of the clockwork movement and a circular opening 60 provided for housing a battery.

Clockwork movement 50 includes first and second monophase transducers 62 and 64 of similar design to the monophase transducer described with reference to FIGS. 1 and 2. The two respective rotors (not shown) of the two transducers 62 and 64 are housed respectively in two holes 66 and 67 machined in plate 52. The first and second stator openings are respectively provided to define partially the first magnetic stator poles 70 and 71 of the two transducers 62 and 64. The second magnetic stator pole of first transducer 62 and the second magnetic stator pole of second transducer 64 is a common magnetic pole 72 formed by the remaining part of plate 52 relative to the two parts of this plate 52 defining first magnetic stator poles 70 and 71. Of course, plate 52 is formed of a magnetic material forming the stator of the two transducers 62 and 64. Second common pole 72 is thus used for the return of the magnetic flux passing through cores 74 and 75 forming respectively first and second transducers 62 and 64 and carrying respectively supply coils 76 and 77. However, the two transducers 62 and 64 are magnetically decoupled from each other.

Coil 76 is situated in stator opening 68 whereas coil 77 is situated in stator opening 69. The edges of stator openings 68 and 69 are closed on themselves. The rotors of the two transducers 62 and 64 are respectively mechanically coupled to wheels 54 and 55 of clockwork movement 50. As is seen clearly in FIG. 3, the two transducers 62 and 64 may be arranged on the surface defined by plate 52 in any manner, at the choice of the watch designer. In particular, coils 76 and 77 are situated in an inner region of plate 52 and not, as in the prior art, at the periphery of the latter.

Figure 4:
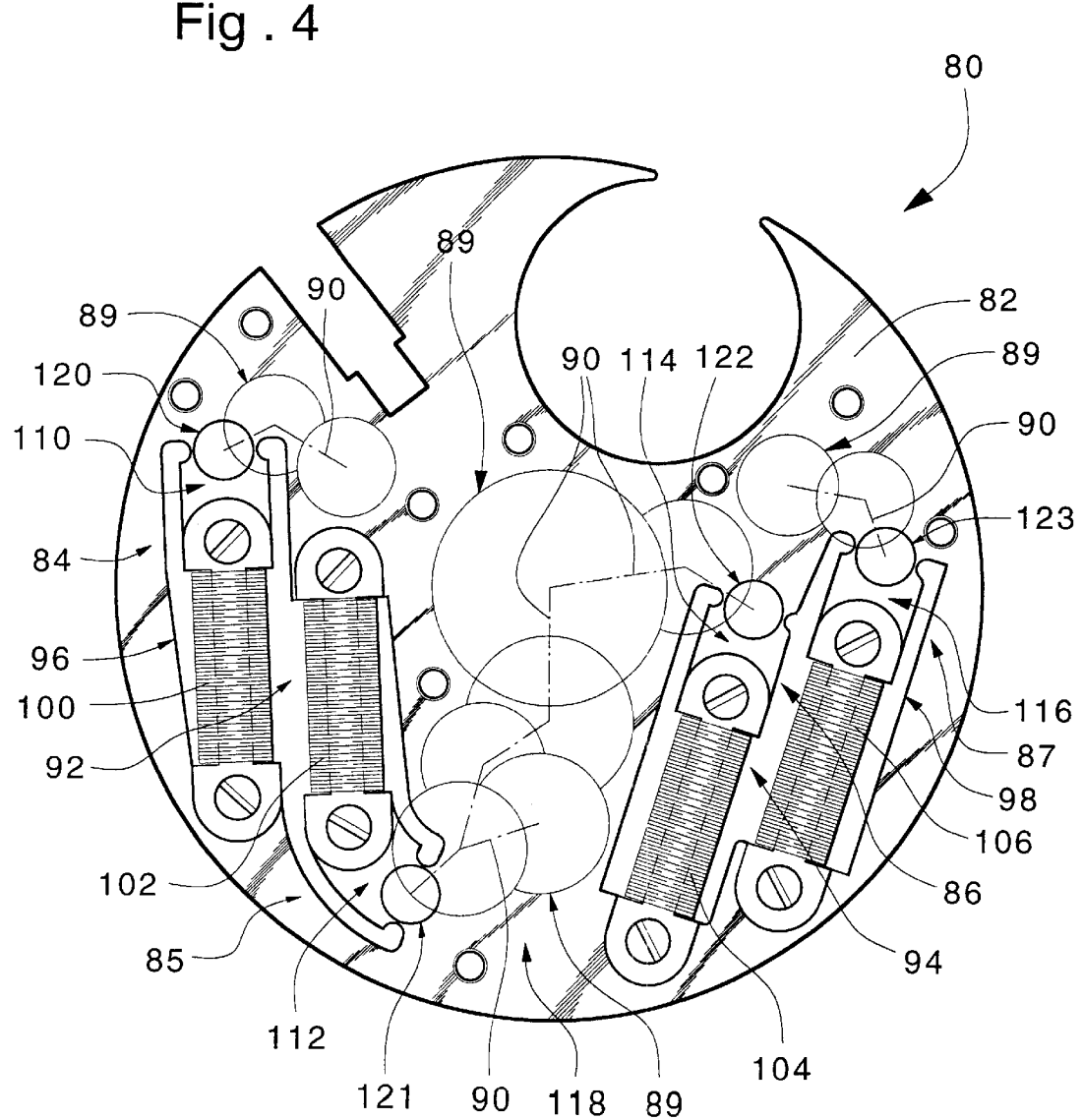
FIG. 4 is a schematic top view of a chronograph clockwork movement including, in addition to the central hang, three counters.

Referring to FIG. 4, a second embodiment of an electromechanical device including a plurality of monophase electromechanical transducers according to the invention will be described hereinafter.

Clockwork movement 80 includes a plate 82 formed of magnetic material and acting as common stator plate for four monophase transducers 84, 85, 86 and 87. The four transducers 84 to 87 are used to drive various wheels 89 of clockwork movement 80. Various kinematic chains have been shown by means of dash and dotted lines 90. Transducers 84, 85, 86 and 87 are monophase transducers according to the present invention, of similar configuration to that described with reference to FIG. 2. Thus, the various elements and parts of these transducers will not be described again here in detail. The embodiment of FIG. 4 differs in particular from the embodiment of FIG. 3 in that stator opening 92, 94 respectively, provided in plate 82 is common to the two monophase transducers 84 and 85, 86 and 87 respectively. The edges 96 and 98 of the two stator openings 92 and 94 are closed on themselves.

Opening 92 surrounds, in superposition in the plane of plate 82, coils 100 and 102 of the two transducers 84 and 85 and the two coils 104 and 106 of the two transducers 86 and 87 respectively. Stator opening 94 defines the first magnetic stator poles 110 and 112 of the two transducers 84 and 85. Likewise, stator opening 94 defines the two first magnetic stator poles 114 and 116 of the two transducers 86 and 87.

The first magnetic stator poles 110, 112, 114 and 116 are magnetically insulated within plate 82, from second common magnetic stator pole 118, used for closing the magnetic flux from transducers 84, 85, 86 and 87, by means of necks provided for this purpose at the periphery of holes 120, 121, 122 and 123 provided for the arrangement of the rotors (not shown) of the transducers. It will be noted that the positioning notches and the permanent magnets of the rotors have not been shown in FIG. 4 to avoid overloading the drawing. However, the man skilled in the art knows how to arrange such positioning notches in an equivalent manner to that of FIGS. 1 and 2 previously described.

It will be noted that the present invention is not limited only to the embodiments described hereinbefore, the man skilled in the art being able to design alternatives within the normal and usual practice of his profession. In particular, the arrangement of the coils and the configuration of the cores may vary. In particular, the cores may be curved.

Finally, it will be noted that the present invention does not apply only to the horological field, but to any application which requires a motor of small dimensions, i.e. requiring little space and easily able to be integrated in a mechanism actuated by such a motor; in particular measuring apparatus, analog counters and audio and/or video apparatus of small dimensions.

What is claimed is:

1. A monophase electromechanical transducer in particular of the horological type including:

a stator made of magnetic material;

a rotor including a permanent magnet;

a coil;

said stator including a planar structure and a core around which said coil is mounted, said planar structure defining two magnetic stator poles whose two respective polar expansions define a hole through which said rotor passes, the permanent magnet of such rotor being magnetically coupled to said two polar expansions, said core having its first and second ends respectively connected to said two magnetic stator poles, wherein said coil is situated in an opening, provided in said planar structure, the edge of which is closed on itself so that the part of said planar structure defining said second magnetic pole surrounds the part of this planar structure defining said first magnetic stator pole and said coil in projection in the general plane of said planar structure.

2. An electromechanical transducer according to claim 1, wherein said hole through which passes said rotor has an edge closed on itself, said hole and said stator opening being separated from each other by two high reluctance necks, said planar structure being formed in a single piece.

3. An electromechanical transducer according to claim 1, wherein said stator defines a base plate onto which elements of an electromechanical device are at least partially mounted, at least one of said elements being mechanically coupled to said rotor of said electromechanical transducer.

4. An electromechanical device including a plurality of electromechanical transducers whose plurality of respective stators are partially formed by a common planar structure defining a plurality of holes through which pass respectively a plurality of rotors of said plurality of electromechanical transducers, wherein at least one transducer of said plurality of electromechanical transducers is a monophase transducer including:

a stator made of magnetic material;

a rotor including a permanent magnet;

a coil;

said stator including a planar structure and a core around which said coil is mounted, said planar structure defining two magnetic stator poles whose two respective polar expansions define a hole through which said rotor passes, the permanent magnet of such rotor being magnetically coupled to said two polar expansions, said core having its first and second ends respectively connected to said two magnetic stator poles, wherein said coil is situated in an opening, provided in said planar structure, the edge of which is closed on itself so that the part of said planar structure defining said second magnetic pole surrounds the part of this planar structure defining said first magnetic stator pole and said coil in projection in the general plane of said planar structure.

5. An electromechanical device according to claim 4, wherein said common planar structure is used as a base plate onto which elements of said electromechanical device are at least partially mounted.

6. An electromechanical device according to claim 5, wherein each rotor of said plurality of rotors is mechanically coupled to one of said elements of said electromechanical device.

7. An electromechanical device according to claim 4, wherein said plurality of electromechanical transducers comprises at least two monophase transducers each including:

a stator made of magnetic material;

a rotor including a permanent magnet;

a coil;

said stator including a planar structure and a core around which said coil is mounted, said planar structure defining two magnetic stator poles whose two respective polar expansions define a hole through which said rotor passes, the permanent magnet of such rotor being magnetically coupled to said two polar expansions, said core having its first and second ends respectively connected to said two magnetic stator poles, wherein said coil is situated in an opening, provided in said planar structure, the edge of which is closed on itself so that the part of said planar structure defining said second magnetic pole surrounds the part of this planar structure defining said first magnetic stator pole and said coil in projection in the general plane of said planar structure, and wherein the two respective coils of said two monophase transducers are arranged in a unique and same stator opening of said planar structure common to those two monophase transducers with respect to a projection in a general plane of said planar structure.

8. An electromechanical device according to claim 4, wherein said device forms an analog indicator for displaying the value of at least a determined variable.

9. An electromechanical device according to claim 8, wherein it forms the movement of a timepiece, said at least displayed variable being the time.

10. An electromechanical transducer according to claim 2, wherein said stator defines a base plate onto which elements of an electromechanical device are at least partially mounted, at least one of said elements being mechanically coupled to said rotor of said electromechanical transducer.

* * * * *

UNITED STATES PATENT AND TRADEMARK OFFICE
CERTIFICATE OF CORRECTION

PATENT NO. : 6,437,466 B1
DATED : August 20, 2002
INVENTOR(S) : Taghezout

It is certified that error appears in the above-identified patent and that said Letters Patent is hereby corrected as shown below:

Title page,
Item [*] Notice, delete "0" and insert -- 508 --.

Signed and Sealed this

Twenty-third Day of August, 2005

JON W. DUDAS
*Director of the United States Patent and Trademark Office*